United States Patent [19]

Desjardins

[11] 4,403,681
[45] Sep. 13, 1983

[54] THREE DIRECTIONAL VIBRATION ISOLATOR

[75] Inventor: Rene A. Desjardins, Media, Pa.

[73] Assignee: The Boeing Company, Seattle, Wash.

[21] Appl. No.: 192,573

[22] Filed: Sep. 30, 1980

[51] Int. Cl.³ ............................................. F16F 7/10
[52] U.S. Cl. .................................. 188/379; 244/17.27
[58] Field of Search .................. 74/574; 188/378–380; 244/17.27

[56] References Cited

U.S. PATENT DOCUMENTS

| | | | |
|---|---|---|---|
| 3,536,165 | 10/1970 | Desjardins | 188/380 |
| 3,921,940 | 11/1975 | Mouille | 244/17.27 |
| 4,085,825 | 4/1978 | Scarborough | 188/378 |
| 4,088,042 | 5/1978 | Desjardins et al. | 188/379 X |

*Primary Examiner*—Duane A. Reger
*Attorney, Agent, or Firm*—Jones, Tullar & Cooper

[57] ABSTRACT

A three-directional vibration isolator, connecting two bodies, which includes spring elements for coupling vibratory forces between the bodies and an inertia assembly for generating inertia forces to attenuate these vibratory forces. The assembly includes a drive member having one end coupled to one body to allow pivotal movement about a first assembly pivot point and an opposite end which extends axially through a tubular member and which is coupled to radially-extending, equiangularly-disposed, inertia arms to allow pivotal movement of the arms about respective first pivot axes orthogonal to the assembly axis. One end of the tubular member is coupled to the other body to allow pivotal movement about a second assembly pivot point and an opposite end thereof is coupled to the inertia arms to allow pivotal movement of the arms about respective second pivot axes parallel to the first pivot axes. Axially-directed vibratory forces cause vibratory movements of the inertia arms which generate inertia forces to oppose these vibratory forces. Vibratory forces acting orthogonally of the assembly axis cause vibratory movements of the entire assembly which generate inertia forces to oppose these vibratory forces. Assembly parameters are selected so that axial movement of one body relative to the other not only causes a change in the distance r' between the two assembly pivot points, but also causes a corresponding change in the distance R' between the assembly center of gravity and the adjacent assembly pivot point, so that the ratio R'/r' is essentially constant.

23 Claims, 14 Drawing Figures

THREE DIRECTIONAL VIBRATION ISOLATOR

BACKGROUND OF THE INVENTION

1. Field of the Invention

This invention relates to a vibration isolation system for reducing vibratory forces transmitted to a body from a vibrating mass connected thereto, and in particular, to a vibration isolation system wherein inertia forces resulting from vibration induced acceleraton of an auxiliary mass connected between the vibrating mass and the body to be protected are transmitted back to the body to oppose and reduce the effects of the undesired vibration.

2. Description of the Prior Art

A known method of isolating a body from a mass which is vibrating at a substantially constant frequency is to connect the vibrating mass to the body by a spring member and by an auxiliary mass which is arranged so that the inertia forces generated by vibration induced displacement of the auxiliary mass acts on the body to substantially cancel the vibratory forces transmitted through the spring member.

To isolate a body from linear vibratory forces in any direction, the vibration isolator must be capable of isolating linear vibratory forces which are directed parallel to any one of three mutually orthogonal axes of the vibrating mass. However, prior known vibraton isolators of this kind are only capable of isolating linear vibratory forces directed along one or two of these three mutually orthogonal axes. Consequently, at least two of these prior known vibration isolators are required to isolate a body connected to a vibrating mass from linear vibratory forces directed parallel to all three axes. For example, a vibration isolator of this type which is capable of isolating linear vibratory forces directed parallel to the plane defined by two of these three mutually orthogonal axes is described in my U.S. patent application, Ser. No. 091,437, filed Nov. 5, 1979.

OBJECTS AND SUMMARY OF THE INVENTION

Therefore, it is an object of the invention to provide a vibration isolator for isolating vibration about three mutually orthogonal axes.

It is another object of the invention to provide an effective vibration isolation system for all six axes—three linear axes and three moment axes—for example, vertical, lateral, longitudinal, pitch, roll, and yaw axes, as applied to a helicopter rotor.

The vibration isolator includes an assembly having an axis and an axially disposed center of gravity which is pivotally connected to both the vibrating mass and to a body to be isolated from vibratory forces transferred to it from the vibrating mass. The assembly substantially includes an axially extending drive member (a first member) which extends through a tubular member (a second member) so that the drive member is translatable along the assembly axis with respect to the tubular member. One end of the drive member is pivotally connected to the inner ends of a plurality of inertia arms, to allow pivotable movement of these inertia arms about respective first pivot axes which are orthogonal to the assembly axis. The inertia arms are equiangularly spaced about the assembly axis and extend radically outward therefrom to tuning weights carried at their outer ends. Each tuning arm is also pivotally connected to an adjacent end of the tubular member to allow rotation of each pivot arm relative to the tubular member about a second pivot axis parallel to the first pivot axis of the inertia arm and disposed between the first pivot axis and the center of gravity of the pivot arm. Thus, when the drive member is moved in one direction along the assembly axis relative to the tubular member, the tuning weights of the inertia arms are moved in an opposite direction.

The opposite end of the drive member is connected to the body to be isolated from vibration by a spherical bearing, to allow pivotal movement of the assembly with respect to the body in any direction about a first pivot point of the drive member. The opposite end of the tubular member is connected to the vibrating mass by another spherical bearing, to allow pivotal movement of the assembly with respect to the vibrating mass in any direction about a second pivot point of the tubular member.

Vibratory forces resulting from the linear vibratory displacement of the vibrating mass relative to the body in a direction parallel to the assembly axis are transmitted to the body through a spring member connected between the drive member and the tubular member, which may be a cylindrical elastomeric bearing, a helical spring, or both. Vibratory forces resulting from the vibratory linear displacement of the vibrating mass relative to the body in a direction orthogonal to the assembly axis are transmitted to the body by an axially extending spring arm affixed at one end to the drive member and pivotally connected to the body at its other end.

Linear vibratory displacements of the vibrating mass products vibratory displacements of the inertia arms about their first and second pivot axes, producing inertia forces which are transmitted to the body to effectively cancel the vibratory forces transmitted to the body through the cylindrical elastomeric bearing or the helical spring connected between the tubular member and the drive member at a particular frequency of operation to which the vibration isolator is tuned.

Linear vibratory displacement of the vibrating mass in any direction orthogonal to the assembly axis causes vibratory pivotal movement of the assembly about its first and second pivot points, producing inertia forces which are transmitted back to the body to oppose the vibratory forces transmitted to the body through the spring arm.

In order for the inertia forces produced by the assembly to cancel the vibratory forces transmitted through the spring arm at a particular selected frequency of vibration, the ratio of the distance between the center of gravity and the adjacent pivot point of the assembly to the distance between the two pivot points of the assembly must be constant. Since linear movement of the vibrating mass relative to the body in a direction parallel to the assembly axis which results in a reduction of the distance between the first and second pivot points of the assembly also causes a rotation of the inertia arms in a direction to reduce the distance between the center of gravity and the two pivot points of the assembly, and vice versa, the ratios of the distance between the center of gravity of each inertia arm and its adjacent pivot point relative to the distance between the two inertia arm pivot points can be selected so that the assembly ratio of the distance between its center of gravity and its adjacent pivot point to the distance between its two pivot points will remain approximately constant during operation of the vibration isolator.

Thus, a single vibration isolator of this type can be used to affect the isolation of a body from a vibrating mass to which it is connected from linear vibratory forces along three mutually orthogonal axes.

Also, only three of these three directional vibration isolators need be used on a helicopter to connect the helicopter transmission with the helicopter fuselage and to isolate the fuselage from linear and rotational vibratory displacement of the helicopter transmission about the three mutually orthogonal, pitch, roll, and yaw axes of the helicopter.

The invention will be better understood, and further objects and advantages thereof will become more apparent from the ensuing detailed description of the preferred embodiments taken in conjunction with the drawings.

DESCRIPTION OF THE PREFERRED EMBODIMENTS

Figure 1:
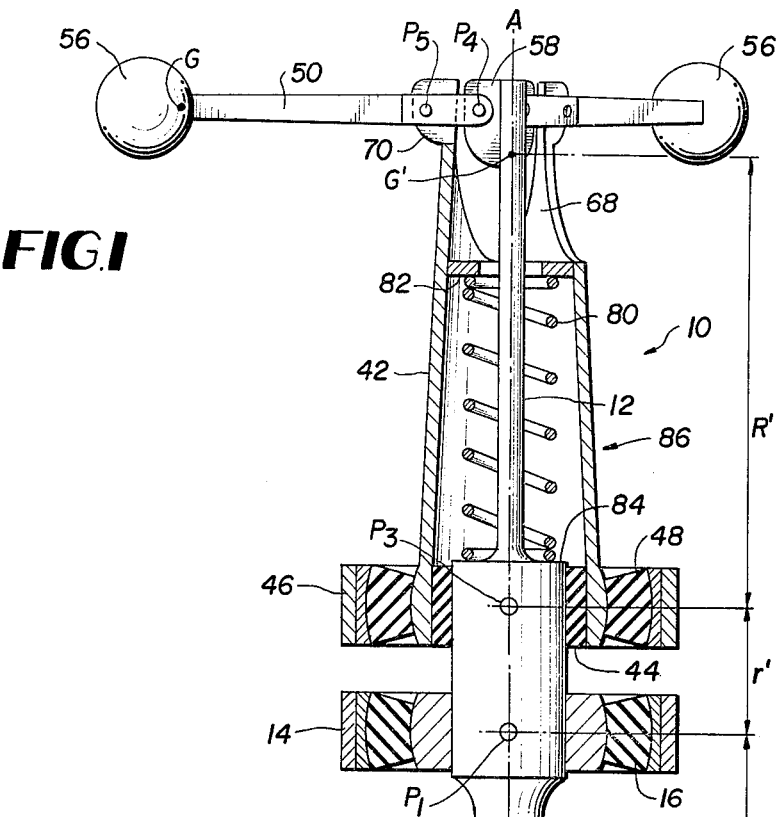
FIG. 1 is a side view, partially in section, of a three directional vibration isolator for isolating a body from linear vibratory forces generated by a vibrating mass connected to the body.
Figure 2:
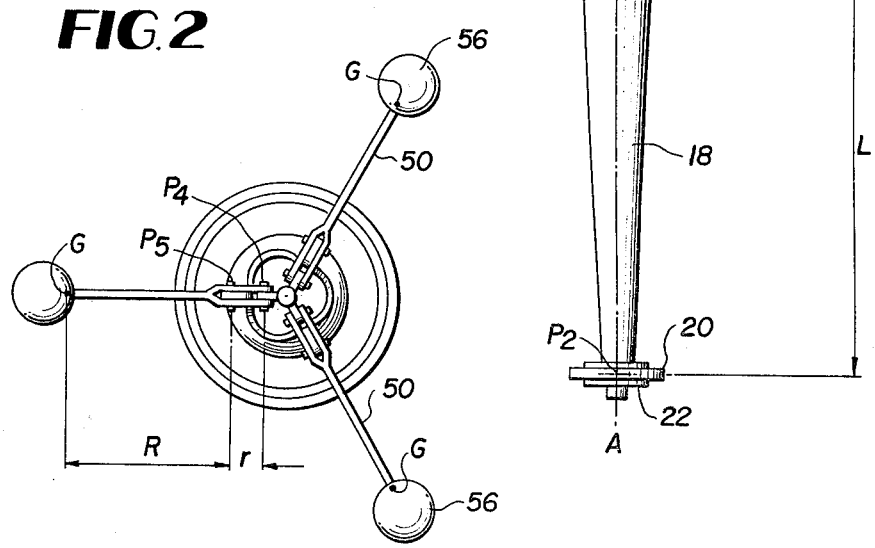
FIG. 2 is a top view of the vibration isolator shown in FIG. 1.

The three directional vibration isolator 10 shown in FIGS. 1 and 2 includes an elongated drive member 12 which extends along the axis A—A of the vibration isolator. The lower end of the drive member 12 is connected to a first mounting flange 14 affixed to a first body (not shown) by a spherical elastomeric bearing 16, similar to those described in the above referenced U.S. patent application Ser. No. 091,437, for pivotal movement in any direction about a first pivot point P1 of the drive member 12 disposed on the isolator axis A—A.

Figure 3:
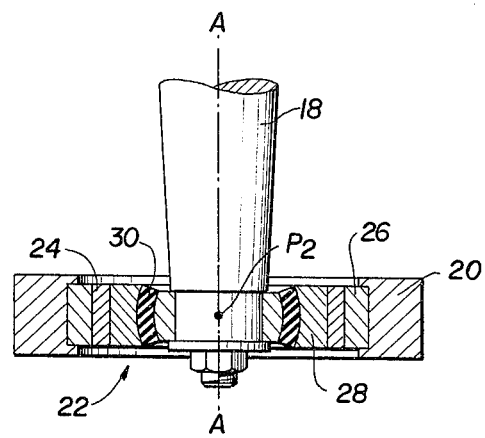
FIG. 3 is an enlarged view of the lower end of the vibration isolator of FIG. 1, showing elements connecting a spring arm of the vibration isolator to the body.
Figure 4:
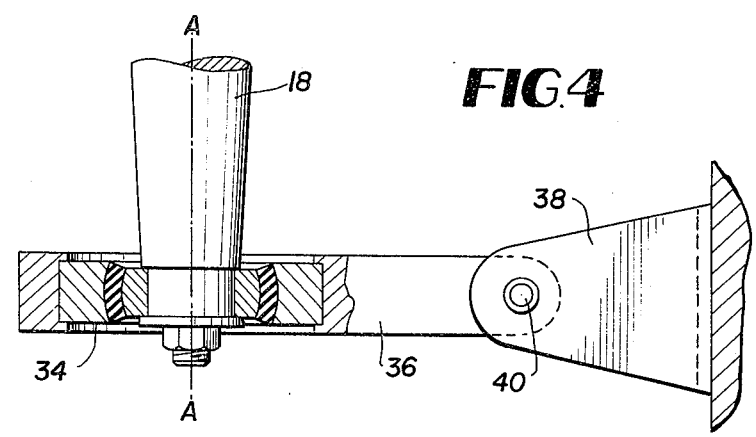
FIG. 4 is an enlarged view of the lower portion of the vibration isolator of FIG. 1, showing an alternative arrangement for connecting the isolator spring arm to the body.

An elongated spring arm 18 has an upper end which is affixed to, or made integral with, the lower end of the drive member 12, as shown in FIG. 1. The lower end of the spring arm 18 is connected to a second mounting flange 20 affixed to the first body by a bearing assembly 22 to allow pivotal movement of the lower end of a spring arm 18 relative to the second mounting flange 20 in any direction about a pivot point P2 of the spring arm 18. The bearing assembly 22 is a combination of: (1) an outer cylindrical bearing 24 having an outer race 26 connected to the second mounting flange 20 and an inner race (the intermediate race 28) which is translatable with respect to the second fuselage mounting 20 along the isolator axis A—A; and (2) a concentrically disposed inner spherical bearing 30 having an outer race (the intermediate race 28) with respect to which the lower end of the spring arm 18 is pivotable in any direction about the pivot point P2 of the spring 18, as illustrated in FIG. 3. Alternatively, the lower end of the spring arm 18 may be connected by a spherical bearing 34 to a foreshorting link 36, which in turn is pivotably connected to a clevis 38 fixed to the fuselage by a pivot pin 40 to allow vertical movement of the lower end of the spring arm 18, as shown in FIG. 4. In any of the embodiments of FIGS. 3 or 4, vertical as well as pivotable movement of the lower end of the spring arm 18 is allowed to accommodate the reduction of the length L of the spring arm 18 between the pivot points P1, P2, as a result of bending of the spring arm 18 during operation of the vibration isolator 10.

The upper end of the drive member 12 extends through a tubular member 42, which is concentrically disposed about the isolator axis A—A. The lower end of the tubular member 42 is connected to the drive member 12 by a low friction, cylindrical bearing 44 which allows translation of the drive member 12 along the isolator axis A—A with respect to the tubular member 42. Also, the lower end of the tubular member 42 is connected to a mounting flange 46 affixed to a second body (not shown) by a spherical elastomeric bearing 48, to allow pivotal movement of the tubular member 42 with respect to the second body in any direction about a pivot point P3 of the tubular member 42.

Figure 5:
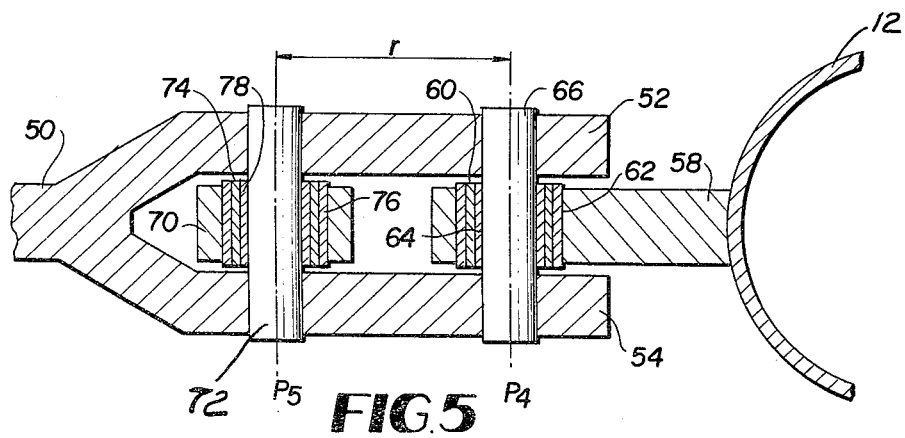
FIG. 5 is an enlarged partial side view of a top portion of the vibration isolator shown in FIG. 1.

The vibration isolator 10 includes three identical, elongated inertia arms 50, which are equiangularly disposed about the isolator axis A—A. Each inertia arm 50 extends radially outward from a bifurcated inner end having two, spaced-apart, parallel end portions 52, 54, as shown in FIG. 5, to an outer end carrying a spherical tuning weight 56. The drive member 12 includes at its upper end three identical plate portions 58 which extend radially from, and are equiangularly spaced about, the isolator axis A—A. Each plate portion 58, which extends between the parallel end portions 52, 54 of an adjacent inertia arm 50, carries a low friction, cylindrical bearing 60 having an outer race 62 affixed to the plate portion 58 and an inner race 64 affixed to a first pivot pin 66 of the adjacent inertia arm 50, which extends orthogonally of the isolator axis A—A between the parallel end portions 52, 54 along a first pivot axis P4 of the inertia arm 50. Thus, each inertia arm 50 is connected to the drive member 12 for pivotal movement of the inertia arm 50 relative to the drive member 12 about the first pivot axis P4 of the inertia arm 50.

The upper end of the tubular member 42 includes three identical end portions 68, which extend parallel to the isolator axis A—A and which are equiangularly disposed about the isolator axis A—A. The upper end of each end portion 68 includes a plate portion 70, which extends radially of the isolator axis A—A. Each of the plate portions 70 of the tubular member 42 is positioned adjacent one of the plate portions 58 of the drive member 12, and also extends between the end portions 52, 54, of an adjacent inertia arm 50 (FIG. 5). Each inertia arm 50 carries a second pivot pin 72, which extends parallel to the first pivot pin 66 between the two end portions 52, 54. Each inertia arm 50 is connected to the tubular member 42 for pivotal movement of the inertia arm 50, relative to the tubular member 42, about a second pivot axis P5 of the inertia arm 50 which is parallel to the first pivot axis P4 of the same inertia arm 50 by a low friction, cylindrical bearing 74 having an outer race 76 affixed to the adjacent plate portion 68 of the tubular member 42, and an inner race 78 affixed to the second pivot pin 72 of the inertia arm 50.

The second pivot axis P5 is disposed intermediate the first pivot axis P4 and the center of gravity G of the mass M of each inertia arm 50, at a distance R from the center of gravity G and at a distance r from the first pivot axis P4.

A helical spring 80, concentrically disposed about the drive member 12 within the tubular member 42, exerts an axial force between an inner flange 82 of the tubular member 42 and a shoulder 84 of the drive member 12 to react axial forces along the isolator axis A—A.

In an alternative arrangement, similar to that described hereinafter in connection with FIG. 11, the helical spring 80 is not required. In such an embodiment, the cylindrical bearing 44, (or 90 in FIG. 11) connected between the drive member 12 and the tubular member 42 to allow translation of the drive member 12 with respect to the tubular member 42 along the isolator axis A—A, which is an elastomeric bearing similar to those described in the above-referenced U.S. patent application, Ser. No. 091,437, is sized to provide the same axial spring rate as provided by the helical spring 80.

Each end portion 68 of the tubular member 42 is designed so that its upper end can be repetitively flexed radially inward toward the isolator axis A—A from its neutral position, to allow movement of the second pivot axis P5 of each inertia arm 50 radially of the isolator axis A—A during linear vibratory movement of one body relative to the other body along the isolator axis A—A, to thus maintain constant the distance r between the pivot axis P4 and P5 and prevent binding of the inertia arm 50. Alternatively, an additional member, similar to the bearing assembly 22 or the foreshorting link 36, may be used to allow radial movement of the pivot axis P4 and/or the pivot axis P5 with respect to the isolator axis A—A, without changing the distance r between the axes P4 and P5.

Since the three identical inertia arms 50 are symmetrically spaced about the isolator axis A—A, the center of gravity G' of an inertia assembly 86 including the three inertia arms 50, the tubular member 42, the drive member 12, and the helical spring 80 will be disposed on the isolator axis A—A when the inertia assembly 86 is disposed in its neutral position.

In designing the vibration isolator 10, the isolator parameters must be selected so that:

(1) at the three pivot axes P4 of the inertia arms 50, the inertia forces $F_i$ developed by the inertia arms 50 in response to linear vibratory displacement of the second body mounting flange 46 relative to the first body mounting flange 14 along the isolator axis A—A, are equal and opposite to the vibratory forces $F_s$ developed through the helical spring 80 or the elastomeric bearing 44 or 90 where a spring is not used for a given frequency $\omega_a$ of the axially-directed linear vibration; and (2) at the pivot point P1 of the inertia assembly 86, the inertia forces $F_i'$ developed by the inertia assembly 86 in response to linear vibratory displacement of the second body mounting flange 46 relative to the first body mounting flange 14 in a plane orthogonal to the isolator axis A—A, are equal and opposite to the vibratory forces $F_s'$ developed through the spring arm 18 for a given frequency $\omega_r$ of the laterally-directed linear vibration.

When the isolator 10 is so designed, the first body undergoes zero displacement in response to axially-directed linear vibratory forces $F_i$ generated at the given vibration frequency $\omega_a$ and/or laterally-directed linear vibratory forces $F_s'$ at the given vibration frequency $\omega_r$, which are transmitted to the first body from the second body, or vice versa.

In order to achieve this isolation of linear vibratory forces at the given vibration frequencies, it is essential to maintain constant the ratio R'/r' of the distance R' between the center of gravity G' of the inertia assembly 86 and the pivot point P3 to the distance r' between the pivot points P1 and P3, and the ratio R/r of each inertia arm 50.

The ratio R/r of each inertia arm 50 is maintained essentially constant during operation of the isolator 10 by the flexing of each end portion 68 of the tubular member 42, which allows translation of each cylindrical bearing 74 radially of the isolator axis A—A to maintain the distance between the cylindrical bearings 60, 74, essentially constant and thus prevent binding of the inertia arm pivot pins 66 and 72 within the bearings 60, 74.

The ratio R'/r' of the inertia assembly 86 is maintained essentially constant during operation of the isolator 10 by proper selection of the ratios R/r and R'/r'. This can be illustrated in a simplified manner by assuming all of the mass M' of the inertia assembly 86 is concentrated at the centers of gravity G of the inertia arms 50. In such a case, the ratio R'/r' can be maintained essentially constant during pivotal movement of the inertia arms 50 and/or pivotal movement of the inertia assembly 86 by selecting the ratio R/r to be equal to the ratio R'/r' when the isolator 10 is disposed in its neutral position as shown in FIG. 1. Then, any movement of the drive member 12 with respect to the tubular member 42 away from its neutral position along the isolator axis A—A will not only shorten or lengthen the distance r', but will also proportionally shorten or lengthen the distance R', so that the ratio R'/r' remains essentially constant. For example, assuming that each of the ratios R/r and R'/r' is equal to 10 and the drive member 12 is moved upward along the isolator axis A—A relative to the tubular member 42 to shorten the distance r' by 1%, the first pivot axis P4 of each inertia arm 50 will be displaced upward by a distance equal to 1% of the initial distance r', and the center of gravity G of each inertia arm 50 will be displaced downward by a distance equal to appoximately 10% of the initial distance r', or, 1% of the initial distance R', so that the ratio R'/r' remains approximately 10. In a similar manner, when the drive member 12 is moved in a downward direction along the isolator axis A—A to increase the distance r' between the pivot points P1 and P3, the center of gravity G of each inertia arm 50 is moved in an upward direction to proportionally increase the distance R' between the center of gravity G' of the inertia assembly 86 and the pivot point P3.

In an actual vibration isolator 10, while the tuning weights 56 constitute most of the mass M' of the inertia assembly 86, the mass of the other elements of the inertia assembly 86, such as the drive member 12, the tubular member 42, and the helical spring 80, must be considered. Thus, in an actual case, the ratio R/r must always be greater than the ratio R'/r' in order to maintain the latter ratio R'/r' constant, to compensate for the drive member 12 and helical spring 80 which move in an opposite direction to the center of gravity G of each inertia arm 50, and for the tubular member 42 which remains stationary relative to the drive member 12 and the inertia arms 50.

Also, the ratio $I/r^2$ of the mass moment of inertia I of each inertia arm 50 about its center of gravity G in a plane perpendicular to its pivot axes P4, P5, to its pivot distance r, and the ratio $I'/(r')^2$ of the mass moment of inertia I' of the inertia assembly 86 about its center of gravity G' in a plane perpendicular to its pivot axes P1, P3, must be maintained essentially constant during operation of the vibration isolator 10 to achieve complete isolation of axial and lateral linear vibration forces at the given vibration frequencies $\omega_a$, $\omega_7$. Since each inertia arm 50 is a rigid member having its center of gravity G and its pivot axes P4, P5 fixedly disposed relative to one another, the ratio $I/r^2$ remains constant during operation of the isolator 10.

However, since the distance r' between the pivot points P1, P3 of the inertia assembly 86 can vary during operation of the vibration isolator 10, the mass moment of inertia I' of the inertia assembly 86 must be proportionally varied to maintained the ratio $I'/(r')^2$ constant. Fortunately, the arrangement of the vibration isolator 10 described above for maintaining constant the ratio R'/r' also serves to maintain essentially constant the ratio $I'/(r')^2$ by displacing the centers of gravity of the three inertia arms 50, the drive member 12, and a helical spring 80 to shorten the distance between these centers of gravity and the center of gravity G' of the inertia assembly 86 and thus decrease the mass moment of inertia I' of the inertia assembly 86 whenever the drive member 12 is moved relative to the tubular member 42 to shorten the distance r' between the pivot points P1, P3 of the inertia assembly 86. Conversely, whenever the distance r' is lengthened, the three inertia arms 50, the drive member 12 and the helical spring 68 are moved so as to increase the mass moment of inertia I' of the inertia assembly 86. This ratio $I'/(r')^2$ can be maintained constant by proper selection of the ratio R'/r', or varying other parameters of the isolator 10, as for example, the distance between the first pivot axis P4 of the three inertia arms 50 and the isolator axis A—A.

For vibratory forces causing linear vibratory displacement of the first body mounting flange 14 relative to the second body mounting flange 46 along the isolator axis A—A, the following first tuning equation, which is explained in detail in U.S. Pat. No. 4,088,042, issued May 9, 1978 to Desjardins et al., is applicable to the vibration isolator 10:

$$\omega_a^2 = K_s/\{3[M \cdot R/r(R/r-1)+I/r^2]\}$$

in which $K_s$ is the spring constant of the helical spring 80, or, of an equivalent elastomeric bearing where the spring 80 is replaced by a cylindrical elastomeric bearing 44 or 90, having a spring constant equivalent to that of the spring 80.

During linear vibratory displacement of the first body mounting flange 14 with respect to the second body mounting flange 46 in a plane orthogonal to the isolator axis A—A, both the inertia assembly 86 and the spring arm 18 affixed to the drive member 12 are displaced. Even though the inertia force $F_i''$ developed during bending of the spring arm 18 is very small in comparison to the inertia force $F_i'$ developed by the displacement of the inertia assembly 86, it should be included in calculating the tuning frequency $\omega_r$. The following second tuning equation, which is derived and described in detail in U.S. Pat. No. 4,140,028, issued Feb. 20, 1979, to Desjardins, is applicable to the vibration isolator 10 for lateral linear vibratory displacement of the first body relative to the second body:

$$\omega_r^2 = K_L/\{M' \cdot R'/r'[R'/r'-1]+I'/(r')^2+Lm_s/kr'\}$$

where $K_L$ = the spring constant of a linear spring equivalent to the cantilevered spring arm 18; and k = a constant depending on the distance d between $G_s$ and P1.

As can be seen in the above tuning equation, the contribution of the spring arm 18 to the inertia forces developed by displacement of the inertia assembly 86 is inversely proportional to the distance r' between the pivot points P1 and P3. However, since the inertia force $F_i''$ developed by displacement of the spring arm 18 is very small compared to the other inertia forces developed, the small variation in the spring arm inertia forces $F_i''$ during operation of the vibration isolator 10 caused by variation in the distance r' between the pivot points P1, P3, does not appreciably change the vibration frequency $\omega_r$.

In designing the vibrator isolator 10, the second tuning equation given above is used to calculate the parameters of the inertia assembly 86 and the spring arm 18 given in this equation, in the same manner as disclosed in the above referenced U.S. patent application Ser. No. 091,437, for calculating the parameters of a two-directional vibration isolator. Then the mass M and the R/r ratio of the inertia arms 50 are selected so as to maintain the ratio R'/r' and $I'/(r')^2$ of the inertia assembly 86 substantially constant during operation of the vibration isolator 10, and the first tuning equation given above is used to determine the spring constant $K_s$ of the helical spring 80 or the cylindrical elastomeric bearing 44.

Generally, the frequency $\omega_a$ of the axially-directed linear vibration will be the same as the frequency $\omega_r$ of the laterally-directed linear vibration. For example, where the vibration isolators 10 are used in a helicopter to isolate the fuselage of the helicopter from vibratory forces generated by the helicopter transmission, or to isolate a platform for instruments adversely affected by vibration from the helicopter fuselage supporting the instrument platform, the vibration frequencies $\omega_a$ and $\omega_r$ will both be the characteristic vibration frequency of the helicopter.

However, the vibration isolator 10 could be used to isolate a body for a vibrating mass whose frequency $\omega_a$ of vibration along a first axis of three orthogonal axes is different from the frequency $\omega_r$ of vibration along the other two axes, by disposing the vibration isolator 10 so that its axis A—A is parallel to the first axis of the vibrating mass, and selecting the spring constant $K_s$ of the helical spring 80 or the elastomeric bearing 44 to tune the isolator 10 to isolate axially directed linear vibratory forces at frequency $\omega_a$.

FIGS. 6-9 illustrate in diagrammatic form various positions assumed by the elements of the vibration isolator 10 during operation of the isolator 10 in response to linear vibratory forces generated at the given vibration frequency which is transmitted to the vibration isolator 10 by the linear vibratory displacement of one of the mounting flanges 20, 46 relative to the other of the mounting flanges 20, 46.

Figure 6:
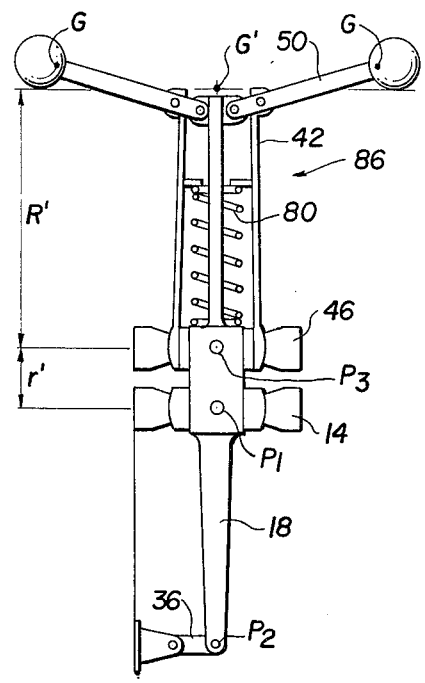
FIGS. 6–9 are schematic representations of the three directional vibration isolator of FIG. 1, showing various operational dispositions of its elements.

In FIG. 6, the second body mounting flange 46 has been displaced vertically upward from its neutral position shown in FIG. 1. As a result, the distance r' between the pivot points P1 and P3 has been increased, and the centers of gravity G of the inertia arms 50 have been displaced upwardly to increase the distance R' between the center of gravity G' of the inertia assembly 86 in proportion to the increase in the distance r', so that the ratio R'/r' remains constant. Also, the upward rotation of the inertia arms 50 and the downward movement of the drive member 12 relative to the tubular member 42 increases the mass moment of inertia I' so that the ratio $I'/(r')^2$ remains substantially constant. The sum of the upwardly directed inertia forces $F_i$ developed at the second pivot axes P5 by the upward rotation of the inertia arms 50 about their pivot axes P4, P5, is equal and opposite to the downwardly directed force $F_s$ developed at these second pivot axes P5 by the helical spring 80, which has been extended from its neutral position.

Figure 7:
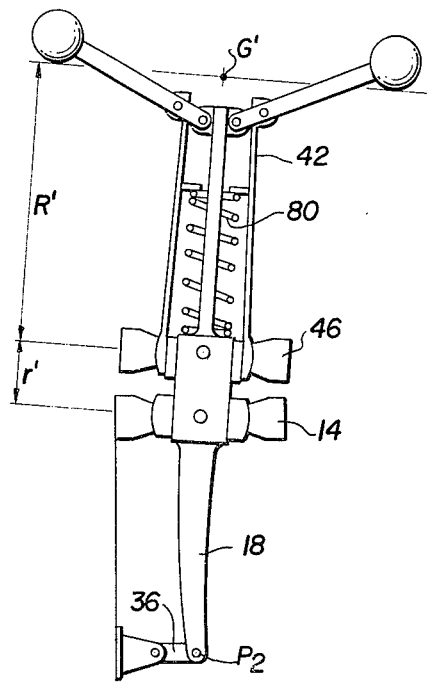

FIG. 7 shows that the position of the vibration isolator 10 after the first body mounting flange 14 has been displaced laterally from its position shown in FIG. 6, to cause clockwise rotation of the inertia assembly 86 about its pivot axes P1, P3. As a result of this rotation, the distance r' between the pivot points P1, P3 has been further lengthened, and the centers of gravity G of the inertia arms 50 have been further displaced along the isolator axis A—A to proportionally increase the distance R' and the mass moment of inertia I', and thus maintain the ratios R'/r' and $I'/(r')^2$ essentially constant. The clockwise directed inertia force $F'_i$ developed at the pivot point P1 is equal and opposite to the counter-clockwise force $F'_s$ developed at this pivot point P1 by the bending of the spring arm 18. The reduction in the length of the spring arm 18 as a result of its bending is accommodated by the foreshorting link 36 connected between the pivot point P2 of the spring arm 18 and the first body.

Figure 8:
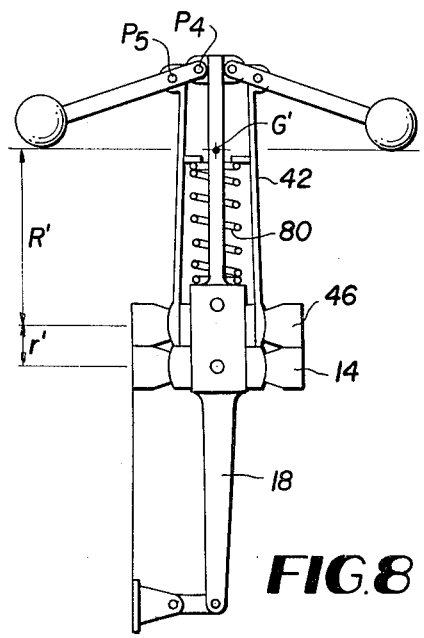

FIG. 8 shows the disposition of the various elements of the vibration isolator 10 when the second body mounting flange 46 is displaced vertically downward from the neutral position shown in FIG. 1 toward the fuselage mounting flange 14. As a result, the distance r' between the pivot points P1, P3 is shortened, and the inertia arms 50 are rotated in a downward direction about their pivot axes P4, P5 to proportionally shorten the distance R' between the moment of inertia M' of the inertia assembly 86 and thus maintain the ratio R'/r' constant, and also to reduce the moment of inertia I' of the inertia assembly 86 so that the ratio $I'/(r')^2$ is not substantially changed. The downward movement of the tubular member 42 relative to the drive member 12 compresses the helical spring 80 so that this spring 80 exerts an upward force $F_s$ at the pivot axes P5 which is equal and opposite to the sum of the downwardly directed inertia forces $F_i$ developed at these pivot axes P5 by the downward rotation of the inertia arms 50.

Figure 9:
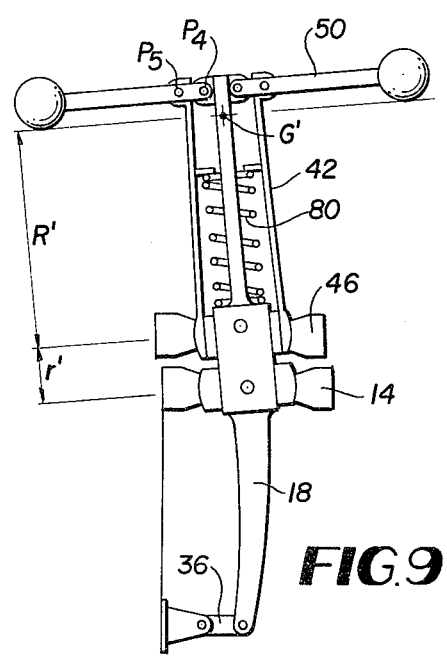

FIG. 9 shows the disposition of the elements of the vibration isolator 10 when the second body mounting flange 46 is moved laterally with respect to the first body mounting flange 14 from the position shown in FIG. 8 to rotate the inertia assembly 86 in a counter-clockwise direction about its pivot points P1, P3. As a result of this lateral movement, the distance r' between the pivot points P1, P3 is increased from that shown in FIG. 8, and the inertia arms 50 are rotated about their axes P4, P5 along the isolator axis A—A in an upward direction to thus maintain the ratios R'/r' and $I'/(r')^2$ of the inertia assembly 86 substantially constant. The inertia force $F'_i$ developed at the pivot point P1 by the counter-clockwise rotation of the inertia assembly 86 about its pivot points P1, P2 is equal and opposite to the clockwise force $F'_s$ also developed at the pivot point P1 by the bending of the spring arm 18.

Figure 10:
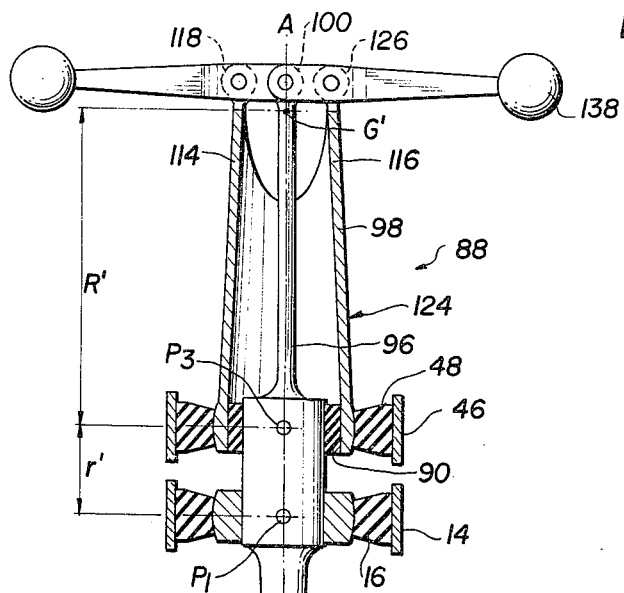
FIG. 10 is a side view, partially in section, of another embodiment of a three directional vibration isolator, according to the invention.
Figure 11:
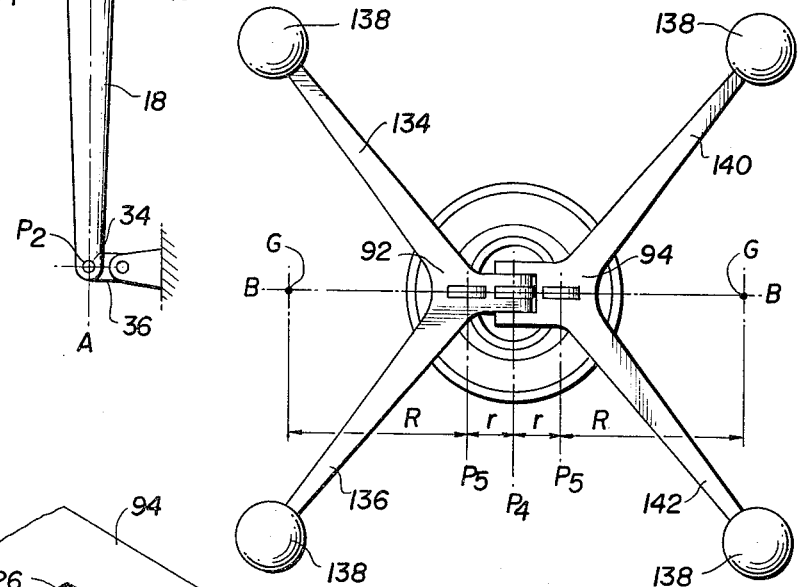
FIG. 11 is a top view of the embodiment shown in FIG. 10.
Figure 12:
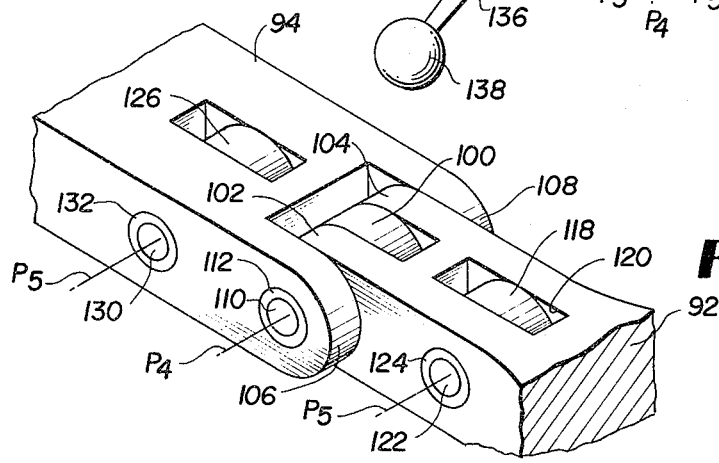
FIG. 12 is an isometric view of a top portion of the embodiment of FIG. 10, showing the connections of inertia arms to other elements of the isolator.

The vibration isolator 88, shown in FIGS. 10-12, is similar to the vibration isolator 10 of FIG. 1, except the helical spring 80 is omitted and the cylindrical elastomeric bearing 90 corresponding to the cylindrical bearing 44 of the isolator 10 is sized to provide the required spring force $F_s$, and the three inertia arms 50 of the isolator 10 are replaced by only two inertia arms 92, 94.

An elongated drive member 96, similar to the drive member 12, extends along the axis A—A of the vibration isolator 88. The lower end of the drive member 96 is connected to the first body mounting flange 14 by the spherical elastomeric bearing 16, described above, for pivotal movement in any direction about the first pivot point P1 of the drive member 96.

The spring arm 18, described above, has an upper end affixed to the drive member 96 and a lower end connected to the first body by the spherical bearing 34 and the fore-shorting length 36, described above, to allow pivotal movement of the lower end of the spring arm 18 in any direction about the pivot point P2 of the spring arm 18.

The lower end of a tubular member 98, similar to the tubular member 42 described above, is connected to the drive member 96 by the cylindrical elastomeric bearing 90 which allows translation of the drive member 96 along the isolator axis A—A with respect to the tubular member 98. Also, the lower end of the tubular member 98 is connected to the second body mounting flange 46 via the spherical elastomeric bearing 48, to allow pivotal movement of the tubular member 98 with respect to the second body in any direction about the pivot point P3 of the tubular member 98.

A flat end portion 100 of the drive member 96 extends between two spaced-apart, parallel end portions 102, 104 of a bifuracted inner end of the inertia arm 92, which in turn extends between two, spaced-apart, parallel end portions 106, 108 of a bifurcated inner end of the inertia arm 94. The pivot pin 110, carried by the drive member end portion 100, extends orthogonally through the isolator axis A—A through the end portions 102, 104, 106, 108, of the two inertia arms 92, 94. Each end portion 102, 104, 106, 108, of the inertia arms 92, 94 is pivotally connected to the pivot pin 110 by a low friction cylindrical bearing 112, to allow pivotal movement of the two inertia arms 92, 94 relative to the drive member 96 about a common first pivot axis P4 of the inertia arms 92, 94, which intersects, and extends orthogonal to the isolator axis A—A. The tubular member 98 includes two diagonally opposite end portions 114, 116, which can be repetitively flexed radially inward towards the isolator axis A—A from the neutral position, similar to the end portions 68 of the tubular member 42 described above. The top end of the end portion 114 is formed as a radially disposed plate 118, which extends into a slot 120 formed through the inertia arm 92, which also extends radially of the axis A—A. A pivot pin 122 extends parallel to the pivot pin 110 through the inertia arm 92 and the plate 118 of the tubular member 98. The plate 118 is connected to the pivot pin 122 by a low friction cylindrical bearing 124 to allow pivotal movement of the inertia arm 92, relative to the tubular member 98, about the second pivot axis P5 of the inertia arm 92 which is parallel to the first pivot axis P4 of this inertia arm 92.

The end portion 116 of the tubular member 98 also includes a radially disposed plate 126 which extends into a radially disposed slot formed through the inertia arm 94. A pivot pin 130, extends parallel to the pivot pin 110 through the inertia arm 94 and the plate 126 and tubular member 98. The plate 126 is connected to the pivot pin 130 by a low friction, cylindrical bearing 132 to allow pivotal movement of the inertia arm 94, relative to the tubular member 98, about the second pivot axis P5 of the inertia arm 94 which is parallel to the first pivot axis P4 of this inertia arm 94.

The bifurcated outer end of the inertia arm 92 includes two sections 134, 136, each carrying at its end a spherical tuning weight 138. Similarly, the bifurcated outer end of the inertia arm 94 includes two sections 140, 142, each carrying out its outer end a spherical tuning weight 138. When the vibration isolator 88 is disposed in its neutral position, as shown in FIGS. 10 and 11, the four tuning weights 138 are disposed equiangularly about, and are equidistant from, the isolator axis A—A, in a plane orthogonal to the axis A—A, so that the moment of inertia of the inertia assembly 124 of the inertia arms 92, 94, the tubular member 94, and the drive member 96, will be approximately the same about any horizontal axis extending through the pivot point P1. Also, when the isolator 88 is in its neutral position, the centers of gravity G of the pivot arms 92, 94, are disposed along an axis B—B orthogonal to the isolator axis A—A which intersects the isolator axis A—A and the pivot axes P4, P5 of the inertia arms 92, 94. The two inertia arms 92, 94, are designed to have approximately the same mass M, and to have their centers of gravity G disposed at approximately the same distance R from their pivot axes P5.

The vibration isolator 88 operates in the same manner as the vibration isolator 10 described above to isolate a body from linear vibratory forces transmitted to the body and acting along any of three, mutually orthogonal axes. The ratio R/r of the distance R between the center of gravity G and pivot point P5 of each inertia arm 92, 94, is selected so as to maintain constant the ratio R'/r' of the distance between the center of gravity G' and the pivot point P3 of the inertia assembly 144. The parameters of the inertia assembly 144 are first calculated in the same manner as the parameters for the inertia assembly 86, using the second tuning equation described earlier. Then, the parameters of the inertia arms 92, 94, are calculated, using the following tuning equation, which is similar to the first tuning equation given above:

$$\omega_a{}^2 = K_s/\{2[M \cdot R/r(R/r-1) + I/r^2]\}$$

in which $K_s$ is the spring constant of the cylindrical elastomeric bearing 90.

Figure 13:
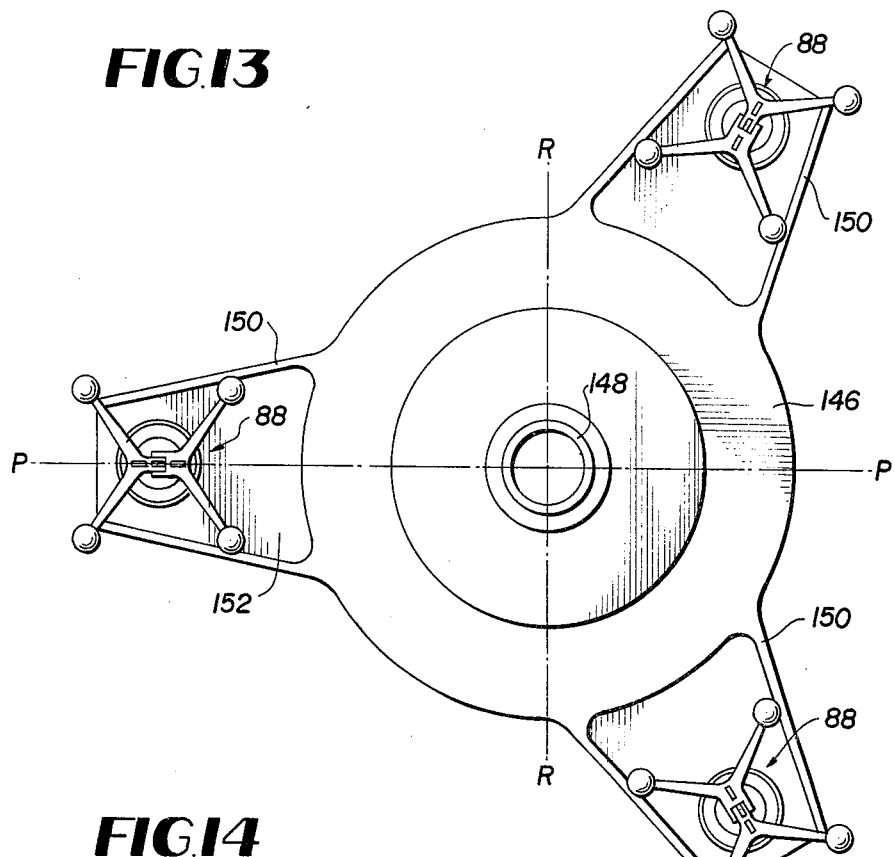
FIG. 13 is a plan view of a helicopter transmission assembly showing a vibration isolation system mounted to the transmission and fuselage.
Figure 14:
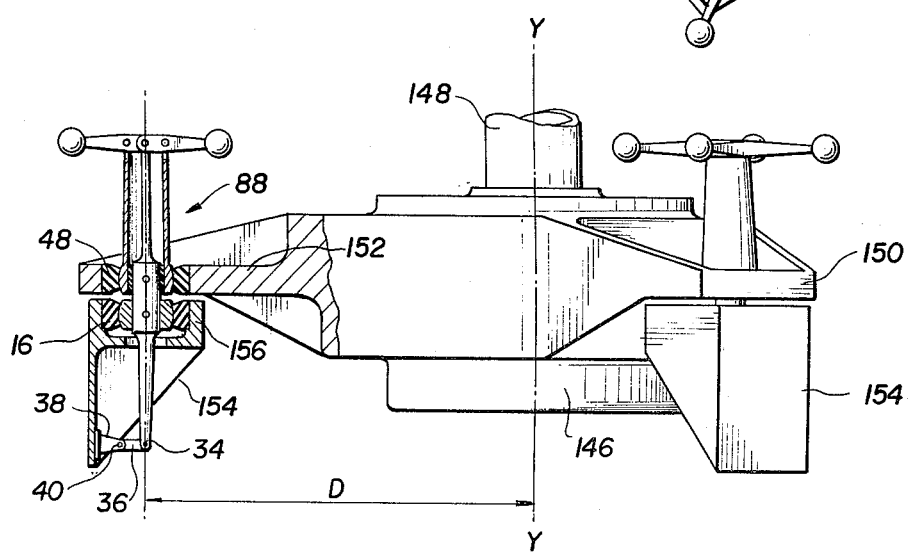
FIG. 14 is a side view of the helicopter transmission assembly and vibration isolation system of FIG. 13.

A single vibration isolator 10, 88 can be used to isolate a body connected to a vibrating mass from linear vibrations occuring at a given vibration frequency along three mutually orthogonal axes (vertical, lateral and longitudinal). Also, only three of these vibration isolators 10, 88 need be used to isolate a body from a vibrating mass from linear or rotational vibratory motion at a given vibration frequency of all six axes (vertical, lateral, longitudinal, pitch, roll and yaw), as for example, the vibration isolation system depicted in FIGS. 13 and 14 for isolating the fuselage of a helicopter from its transmission.

The helicopter transmission includes a transmission casing 146, which is joined to the helicopter rotor (not shown) by a rotor shaft 148 extending vertically along the yaw axis Y—Y. The rotor shaft 148 is mounted within the transmission casing 146 on bearings which permit relative rotation therebetween, but which react and transmit to the transmission casing 146 all linear forces (vertical, longitudinal, and lateral) and all moments (roll, pitch and yaw) present in the helicopter rotor.

The transmission casing 146 includes three radially extending arms 150, which are symmetrically disposed at 120° intervals about the rotor shaft 148. Each arm 150 includes a flanged portion 152 which affixed to the outer race of the spherical elastomeric bearing 48 of a vibration isolator 88.

The helicopter fuselage includes three support members 154, each having a flanged portion 156 connected to the outer race of the spherical elastomeric bearing 16 of the isolator 88. Also, each support member 154 carries a clevis 38, which is connected by the pivot pin 40 to the foreshorting link 36, which in turn is connected to the lower end of the spring arm 18 of the vibration isolator 88 by the spherical bearing 34, to allow vertical and well as pivotal movement of the lower end of the spring arm 18 with respect to the support member 154.

All three vibration isolators 88 will respond fully to a linear vibratory force acting in the direction of the vertical yaw axis Y—Y; hence, the system spring constant, or system stiffness, is three times the spring constant $K_s$ of the cylindrical elastomeric bearing 90.

Also, all three vibration isolators will fully respond to a linear vibratory force acting in the direction of the lateral, or roll axes R—R, or in the direction of the longitudinal or pitch axes P—P; hence, the system spring constant is three times the spring constant $K_1$ of a linear spring equivalent to the spring arm 18 for any linear vibratory force acting in a direction orthogonal to the vertical axis Y—Y.

In the case of a vibratory moment, acting in one direction about the yaw axis Y—Y, each vibration isolator 88 will exert horizontally acting inertia forces at their respective fuselage pivot points P1 to produce an inertia moment about the yaw axis Y—Y in an opposite direction of rotation from that of the yaw vibratory moment, which is proportional to the square of the distance D between the fuselage pivot points P1 of each isolator 88 and the yaw axis Y—Y. Thus, the system angular spring rate will be proportional to $3D^2 \times K_1$.

In the case of a vibratory moment acting in one direction of rotation about a particular horizontal axis which is disposed at an angle λ with a horizontal axis P—P, the vibration isolator 88 disposed along the axis P—P will exert a vertical acting inertia force at its fuselage pivot point P1, to produce an inertia moment about the particular horizontal axis in an opposite direction of rotation to that of the vibratory moment which is proportional to $(D \sin \alpha)^2$. The other two vibration isolators 88 will produce vertical acting inertia forces at their respective pivot points P1, to produce inertia moments about the particular horizontal axis in an opposite direction of rotation to that of the vibratory moment, which are proportional to $(D \sin \alpha + 120°)^2$ and $(D \sin \alpha + 240°)^2$, respectively. Thus, a system angular spring rate in this case will be proportional to:

$$K_s[(D \sin \alpha)^2 + (D \sin \alpha + 120°)^2 + (D \sin \alpha + 240°)^2]$$

Since $\sin(A+B) = \sin A \cos B + \cos A \sin B$, the system angular spring rate will be proportional to $$K_s D^2[\sin \alpha^2 + (\sin \alpha \cos 120° + \cos \alpha \sin 120°)^2 + (\sin \alpha \cos 240° + \cos \alpha \sin 240°)^2]$$

which can be reduced to $$(3/2)K_s D^2[\sin \alpha^2 + \cos \alpha^2].$$

Since $\sin \alpha^2 + \cos \alpha^2 = 1$, the system angular spring rate will be proportional to $(3/2)K_s D^2$.

Since various modifications, adaptations, and variations can be made in the embodiments of the invention specifically described herein without departing from the spirit or scope of the invention, it is intended that the scope of the invention is to be determined by the appended claims.

What is claimed is:

1. A vibration isolator for connecting a body to a vibrating mass with minimum transfer of vibration therebetween, comprising:
   a first member connected to the body at two locations;
   a second member connected to the vibrating mass at one location and to the first member at a plurality of locations; and
   a plurality of inertia arms each connected to the first member and the second member, forming thereby all but one of the plurality of connections of the second member to the first member, whereby displacement of the second member in response to a vibratory force imposed by the vibrating mass produces a relative displacement of the first member and second member and a given displacement of the inertia arms in the direction of the second member which produces a net balancing force opposed to the vibratory force.

2. The vibration isolator as defined in claim 1, wherein each inertia arm is pivotally connected to the first member and to the second member, with the pivotal connections lying adjacent each other.

3. The vibration isolator as defined in claim 1, wherein the first member includes a spring which extends between the two connecting locations of the first member to the body.

4. In a vibration isolator for connecting two elements, namely a body and a vibrating mass, with minimum transfer of vibration therebetween, which includes spring means for coupling vibratory forces between the vibrating mass and the body, and inertia means coupled between the vibrating mass and the body for applying forces to the body which substantially attenuate vibratory forces of a predetermined frequency coupled through the spring means, the improvement wherein the inertia means includes an assembly having an axis and an axially disposed center of gravity, the assembly further comprising:
   an axially-extending driver member having opposite ends,
      a first pivot point disposed on the assembly axis adjacent one end of the drive member, and
      first connecting means for connecting the drive member to one of the two elements, to allow pivotal movement of the drive member with respect to the one element about the first pivot point in any direction;
   an axially-extending tubular member, through which the other end of the drive member extends, with a portion of the drive member being telescopically received by an adjacent portion of the tubular member so that the drive member is translatable along the assembly axis with respect to the tubular member, the tubular member having opposite ends,
      a second pivot point disposed intermediate the first pivot point and the assembly center of gravity on the assembly axis adjacent one end of the tubular member, the other end of the tubular member being disposed adjacent the other end of the drive member, and
      second connecting means for connecting the tubular member to the other of the two elements, to allow pivotal movement of the tubular member with respect to the other element about the second pivot point in any direction; and
   a plurality of radially-extending inertia arms, equiangularly disposed about the assembly axis, each inertia arm having opposite ends,
      a center of gravity,
      a first pivot axis which is disposed substantially orthogonal to the assembly axis adjacent one end of the inertia arm,
      a second pivot axis which is disposed parallel to the first pivot axis intermediate the first pivot axis and the center of gravity of the inertia arm,
      third connecting means for connecting the other end of the drive member to the inertia arm to allow pivotal movement of the inertia arm with respect to the drive member about the first pivot axis of the inertia arm, and
      fourth connecting means for connecting the other end of the tubular member to the inertia arm, to allow pivotal movement of the inertia arm with respect to the tubular member about the second pivot axis of the inertia arm.

5. A vibration isolator as described in claim 4, wherein for each inertia arm, a ratio R/r of a distance R between the inertia arm center of gravity and the inertia arm second pivot axis to a distance r between the inertia arm first and second pivot axes is selected so that a ratio R'/r' of a distance R' between the assembly center of gravity and the second pivot point to a distance r' between the first and second pivot points remains essentially constant;
   whereby the ratio R/r of the inertia arms is greater than the ratio R'/r' of the assembly.

6. A vibration isolator as described in claim 4, wherein said plurality of inertia arms comprises at least three substantially identical inertia arms.

7. A vibration isolator, as described in claim 4, wherein said plurality of inertia arms comprises two inertia arms having the same first pivot axis which intersects the assembly axis.

8. A vibration isolator, as described in claim 4, wherein the moment of inertia of the assembly is approximately the same about any axis of a plane orthogonal to the assembly axis.

9. A vibration isolator as described in claim 4, wherein the first and second connecting means comprise respective spherical elastomeric bearings.

10. A vibration isolator as described in claim 4, wherein the other end of the tubular member comprises a plurality of portions corresponding to the plurality of inertia arms, each portion having a free end connected to a corresponding inertia arm by the fourth connecting means, each portion having the capability of being repetitively flexed to allow movement of its free end radially of the assembly axis.

11. A vibration isolator as described in claim 4, wherein the spring means comprises:
first spring means for coupling linear vibratory forces acting in a direction parallel to the assembly axis between the vibrating mass and the body; and
second spring means for coupling linear vibratory forces acting in a direction orthogonal to the assembly axis between the vibrating mass and the body.

12. A vibration isolator as described in claim 11, wherein the first spring means comprises a cylindrical elastomeric bearing connected between the drive member and the tubular member.

13. A vibration isolator as described in claim 11, wherein the first spring means comprises a helical spring connected between the drive member and the tubular member.

14. A vibration isolator as described in claim 11, wherein the second spring means comprises an elongated spring arm having one end affixed to the one end of the drive member and an opposite end pivotally connected to one of the two elements.

15. A vibration isolator, as described in claim 14, wherein the opposite end of the spring arm is pivotally connected to the body.

16. A vibration isolator, as described in claim 15, which further comprises:
connection means for connecting the opposite end of the spring arm to the body to allow pivotal movement of the opposite end of the spring arm relative to the body in any direction about a pivot point of the spring arm, and to allow movement of the spring arm pivot point along the assembly axis.

17. In a vibration isolation system for connecting two elements, namely a body and a vibrating mass, and for isolating the body from vibratory forces, generated by the vibrating mass, which include linear vibratory forces acting along, and rotational vibratory forces acting about, three mutually orthogonal axes, i.e., vertical, lateral, and longitudinal axes, wherein the vibration isolation system includes a plurality of vibration isolators, each vibration isolator having spring means for coupling the vibratory forces between the vibrating mass and the body, and inertia means coupled between the vibrating mass and the body for applying forces to the body which substantially attenuate the vibratory forces coupled through the spring means, the improvement wherein the inertia means of each vibration isolator includes an assembly having an axis and an axially disposed center of gravity, the assembly further comprising:

an axially-extending drive member having
opposite ends,
a first pivot point disposed on the assembly axis adjacent one end of the drive member, and
first connecting means for connecting the drive member to one of the two elements, to allow pivotal movement of the drive member with respect to the one element about the first pivot point in any direction;
an axially-extending tubular member, through which the other end of the drive member extends, with a portion of the drive member being telescopically received by an adjacent portion of the tubular member so that the drive member is translatable along the assembly axis with respect to the tubular member, the tubular member having
opposite ends,
a second pivot point disposed intermediate the first pivot point and the assembly center of gravity on the assembly axis adjacent one end of the tubular member, the other end of the tubular member being disposed adjacent the other end of the drive member, and
second connecting means for connecting the tubular member to the other of the two elements, to allow pivotal movement of the tubular member with respect to the other element about the second pivot point in any direction; and
a plurality of radially-extending inertia arms, equiangularly disposed about the assembly axis, each inertia arm having
opposite ends,
a center of gravity,
a first pivot axis which is disposed substantially orthogonal to the assembly axis adjacent one end of the inertia arm,
a second pivot axis which is disposed parallel to the first pivot axis intermediate the first pivot axis and the center of gravity of the inertia arm,
third connecting means for connecting the other end of the drive member to the inertia arm to allow pivotal movement of the inertia arm with respect to the drive member about the first pivot axis of the inertia arm, and
fourth connecting means for connecting the other end of the tubular member to the inertia arm, to allow pivotal movement of the inertia arm with respect to the tubular member about the second pivot axis of the inertia arm.

18. A vibration isolation system as described in claim 17, wherein for each inertia arm of each vibration isolator, a ratio $R/r$ of a distance $R$ between the inertia arm center of gravity and the inertia arm second pivot axis to a distance $r$ between the inertia arm first and second pivot axes is selected so that a ratio $R'/r'$ of a distance $R'$ between the assembly center of gravity and the second pivot point of each vibration isolator to a distance $r'$ between the first and second pivot points of each vibration isolator remains essentially constant during linear movement of the drive member with respect to the tubular member of each vibration isolator.

19. A vibration isolation system, as described in claim 18, wherein the moment of inertia of the inertia means assembly of each vibration isolator is approximately the same about any axis of a plane orthogonal to the assembly axis.

20. A vibration isolation system as described in claim 19, wherein the spring means of each vibration isolator comprises:
first spring means for coupling linear vibratory forces acting in a direction parallel to the assembly axis between the vibrating mass and the body; and
second spring means for coupling linear vibratory forces acting in a direction orthogonal to the assembly axis between the vibrating mass and the body.

21. A vibration isolation system as described in claim 17, wherein the plurality of vibration isolators comprises at least three vibration isolators having corresponding portions which are disposed in a common plane equidistant from, and equiangularly about, an axis orthogonal to the common plane.

22. A vibration isolation system, as described in claim 21, wherein each vibration isolator is disposed in parallel arrangement with every other vibration isolator.

23. A vibration isolation system, as described in claim 22, wherein the vibration mass is the transmission of a helicopter and the body is the fuselage of the helicopter, and the axis about which the vibration isolators are equiangularly disposed is the axis of the helicopter rotor shaft.

* * * * *